Figure 1:
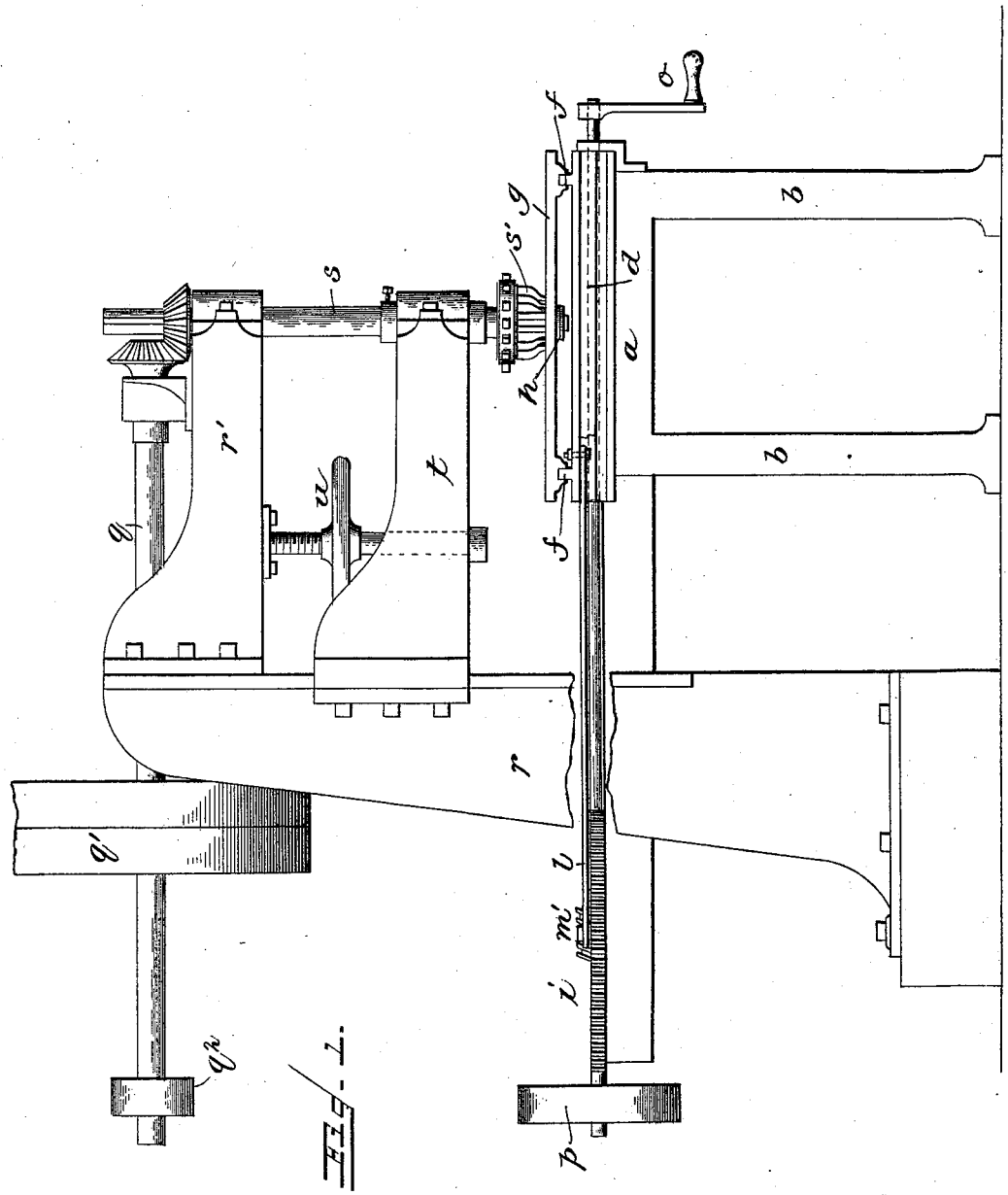

(No Model.) 3 Sheets—Sheet 1.
W. H. EVANS.
STONE MOLDING MACHINE.

No. 478,226. Patented July 5, 1892.

WITNESSES
INVENTOR
William H. Evans (No Model.) 3 Sheets—Sheet 2.
W. H. EVANS.
STONE MOLDING MACHINE.
No. 478,226. Patented July 5, 1892.
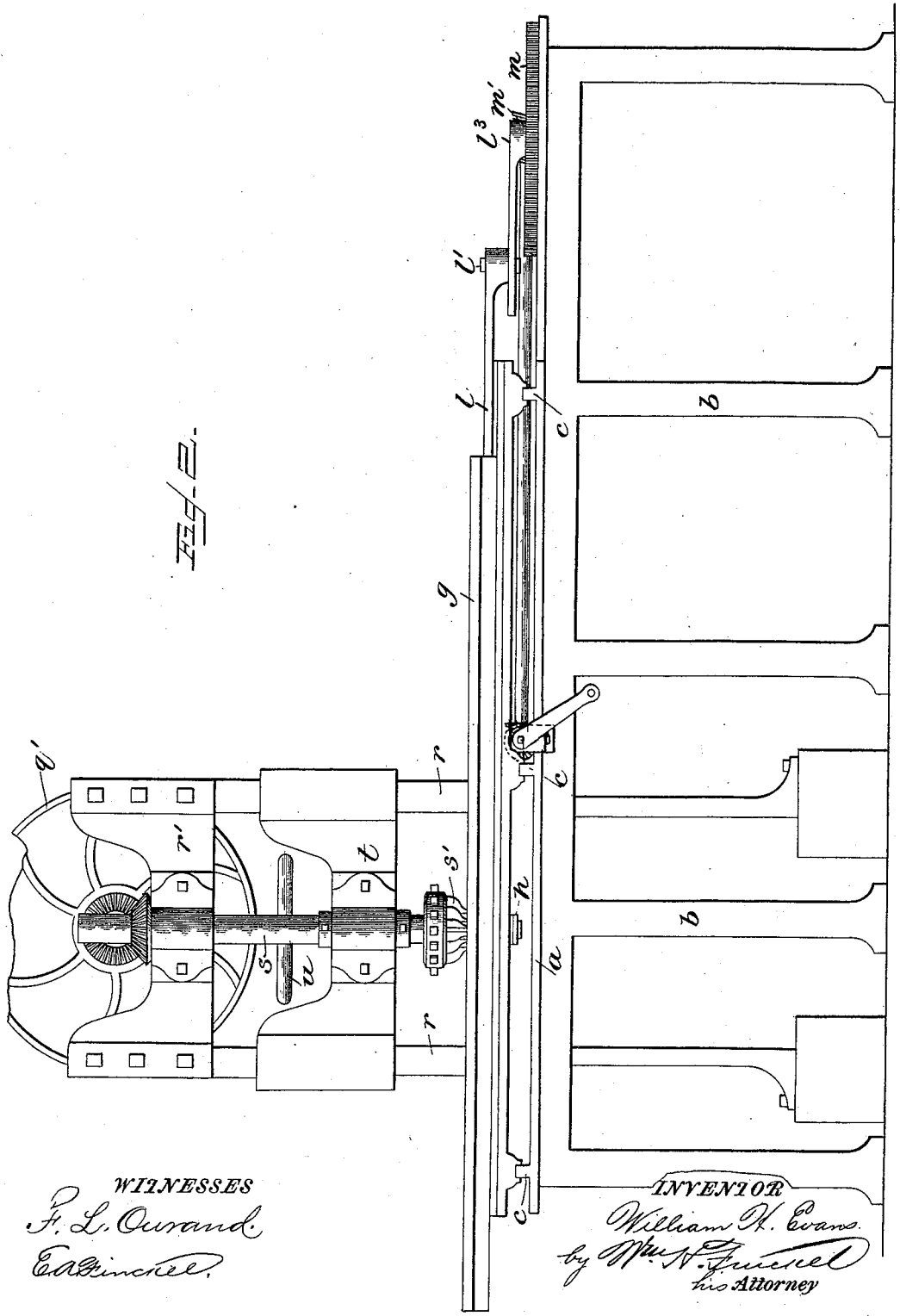
WITNESSES
F. L. Ourand.
E. A. Kincaid.
INVENTOR
William H. Evans.
by Wm. N. Freewell
his Attorney

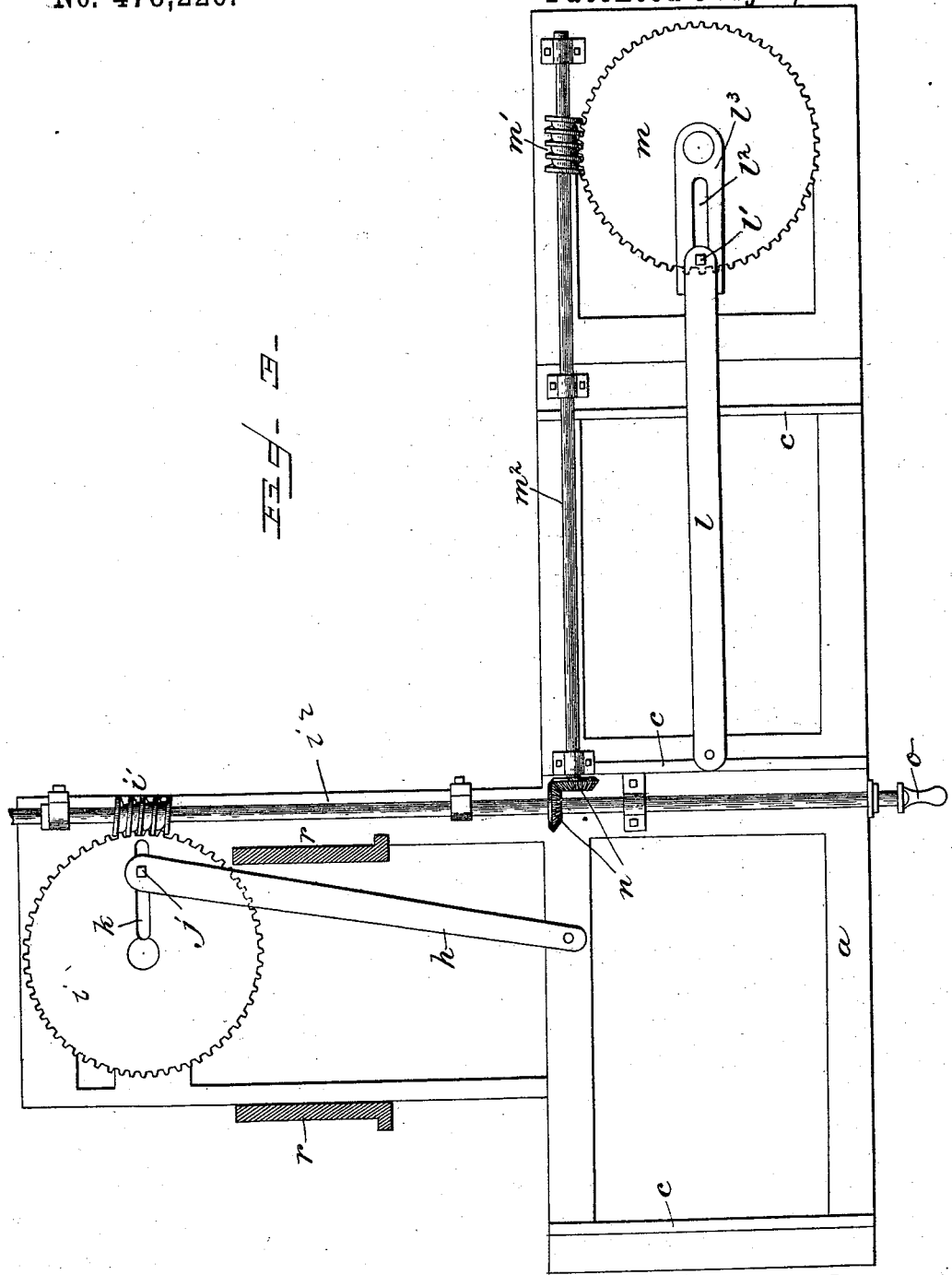

UNITED STATES PATENT OFFICE.

WILLIAM H. EVANS, OF BALTIMORE, MARYLAND.

STONE-MOLDING MACHINE.

SPECIFICATION forming part of Letters Patent No. 478,226, dated July 5, 1892.

Application filed January 16, 1892. Serial No. 418,301. (No model.)

*To all whom it may concern:*

Be it known that I, WILLIAM H. EVANS, a citizen of the United States, residing at Baltimore, in the State of Maryland, have invented a certain new and useful Improvement in Stone-Molding Machines, of which the following is a full, clear, and exact description.

This invention relates more especially to that class of machines set forth in my Letters Patent No. 462,760, dated November 10, 1891, and which are specially designed for molding or carving the edges of oval openings in stone slabs, such as wash-basin slabs; and the object of the invention is to simplify the means for obtaining such work.

In the illustration of my invention accompanying this specification I have shown a cutter-head adapted to be revolved in a fixed vertical plane and have provided two tables or stone-carriages, one mounted upon the other and movable with it and also movable at right angles to the one upon which it is mounted at variable speed by gearing having a prime mover common to both in order to obtain as a resultant of such rectilinear variable movements a curvilinear motion about the cutter.

In the accompanying drawings, illustrating my invention, in the several figures of which like parts are similarly designated, Figure 1 is a side elevation with the standard broken out to bring the view within the sight of the sheet of drawing-board. Fig. 2 is a front elevation; and Fig. 3 is a plan with the superstructure removed, showing the motion-compounding mechanism.

A frame-work $a$ is supported on suitable legs $b$ and has the rails $c$. On these rails is mounted the transversely-movable table or carriage $d$, and on this carriage $d$ are fixed the rails $f$, upon which is mounted the longitudinally-movable table or carriage $g$, and on this carriage the stone may be secured in any suitable manner. The carriage $d$ is connected by a rod or bar $h$ with a worm-wheel $i$, journaled in the frame-work, and the said rod is connected with the said worm-wheel by a bolt $j$, fitted in a radial slot $k$ in said worm-wheel, so that said rod may be adjusted to vary its stroke. The carriage $g$ is connected by a rod or bar $l$ with worm-wheel $m$, journaled in the frame-work, and this connection is effected by a bolt $l'$, secured in a radial slot $l^2$ of an arm $l^3$ on the said worm-wheel and turning with it, so as to enable the rod $l$ to be adjusted to vary its stroke. The rods $h$ and $l$ are secured to their respective worm-wheels distant one hundred and eighty degrees, in order that as one of the tables is moving slowly the other shall move fast and so convert the rectilinear reciprocations of the tables or carriages into an elliptical movement. The worm-wheels $i$ and $m$, by functional analogy to the reciprocator of my patent referred to, are herein designated "reciprocators." These reciprocators are rotated by worms $i'$ and $m'$, respectively, and the shafts $i^2$ and $m^2$ of these worms are driven synchronously by miter-wheels $n$ $n$. Of these shafts $i^2$ and $m^2$ the shaft $i^2$ is the driving-shaft, and it may be rotated by a hand-crank $o$ or by power applied to a pulley $p$.

The main power-shaft $q$ has its bearings in the standard $r$ and head $r'$ and may be provided with usual band-pulleys $q'$ and a second pulley $q^2$, the latter to be belted to pulley $p$ when desired. The cutter-head shaft or spindle $s$ and the power-shaft $q$ may be connected by miter-gears, as shown. The said cutter shaft or spindle is supported in a bracket $t$, which is adjustable vertically by means of the hand-screw $u$, as usual, to set and remove the cutter-head $s'$, said cutter-head and its shaft or spindle always remaining in the same vertical plane.

The gist of the invention is the cutter-head revolving in a fixed vertical plane, combined with two tables moving in right lines at variable rates, whereby their motions are compounded to give as a resultant an oval or curvilinear motion to the stone being molded, this compound movement being effected by the two synchronized reciprocators.

Obviously a third table or carriage may be used in order to adjust the stone in the first instance to the cutter-head, and as this is a common feature I have not herein illustrated it.

The connecting-rods $h$ and $l$ will be adjusted toward or from the centers of their reciprocators, according as an oval of smaller or larger diameter is to be molded or carved.

While worm-gearing and shafting geared together as herein shown are believed to give the best results, in that all motions are positive, yet I do not wish to be understood as limiting my invention to any particular means for synchronizing the reciprocators.

What I claim is—

1. In a machine for molding stone, the combination of a cutter-head revolving in a fixed vertical plane with two work tables or carriages independent of and disconnected from the cutter-head, one mounted upon the other and moving with it and also having a motion of its own at right angles to the other, the motor mechanisms of the two carriages being synchronized at variable rates of motion, thereby to compound the rectilinear movements of the carriages into a resultant curvilinear motion, substantially as and for the purpose described.

2. The combination, with a longitudinally-movable carriage and a carriage mounted thereon and movable therewith and also independently movable transversely thereof, of synchronized reciprocators connected with said carriages, adjustable connections between such reciprocators and carriages, a common prime motor, and a rotary cutter-head mounted in bearings wholly independent of the two carriages, substantially as and for the purpose described.

In testimony whereof I have hereunto set my hand this 14th day of January, A. D. 1892.

WILLIAM H. EVANS.

Witnesses:
  PH. H. HOFFMAN,
  J. A. O. TUCKER.